May 19, 1942.  A. B. MODINE  2,283,277
GOLF SWING INDICATOR
Filed Dec. 30, 1939  2 Sheets-Sheet 1

Witness
V. Siljander

Inventor.
Arthur B. Modine
By Hee & Hee Attys

May 19, 1942.     A. B. MODINE     2,283,277
GOLF SWING INDICATOR
Filed Dec. 30, 1939     2 Sheets-Sheet 2
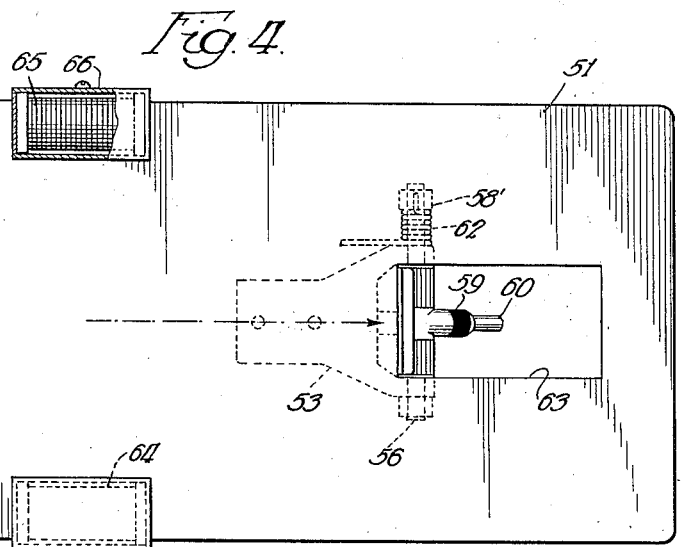
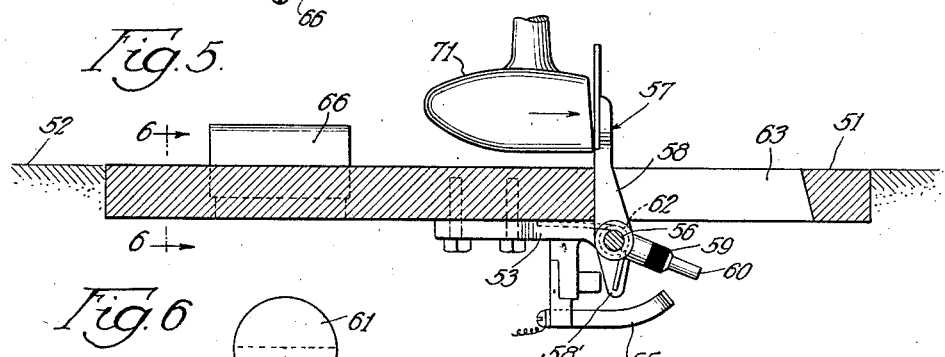
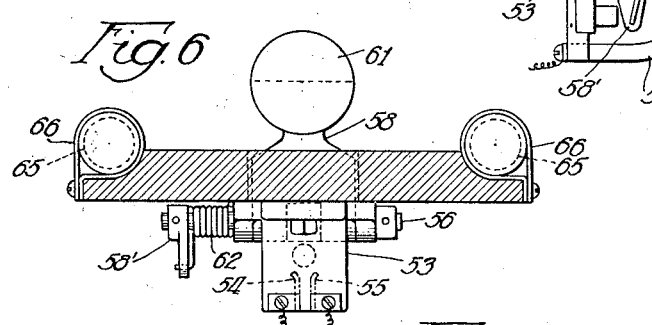
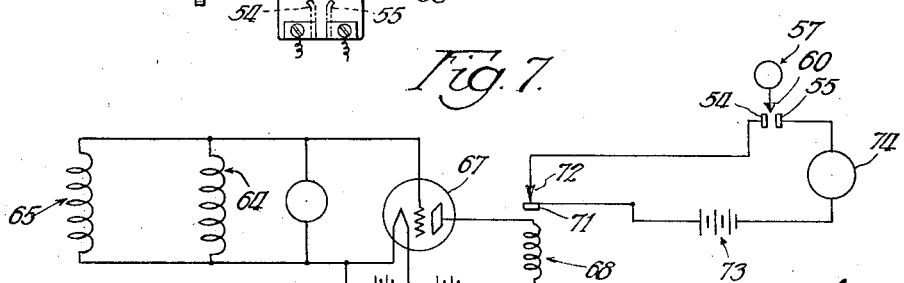
Witness:
V. Siljander
Inventor
Arthur B. Modine
By Stice & Stice Attys.

Patented May 19, 1942

2,283,277

UNITED STATES PATENT OFFICE 2,283,277

GOLF SWING INDICATOR

Arthur B. Modine, St. Petersburg, Fla.

Application December 30, 1939, Serial No. 311,953

13 Claims. (Cl. 273—35)

The invention relates generally to indicating devices, and more particularly to devices adapted for indicating the path or characteristics of a golfer's swing.

The invention has among its objects the construction of indicating devices which are simple in construction, durable, and very efficient in operation.

Another object of the invention is the construction of such an indicating device which requires no mechanical or electrical connections to the club or other instrument.

Another object of the invention is the construction of such a device by means of which the golfer may, if desired, be given an indication when he is hitting the ball in a straight line or curving it to the left or right to produce a so-called hook or slice.

Another object of the invention is the construction of such a device which may be adapted to give an indication of the approximate speed or distance the ball would ordinarily travel.

A further object of the invention is the construction of a device utilizing a current induced by the club head in its movement to actuate the indicating means.

Many other objects and advantages of the invention herein shown and described will be obvious to those skilled in the art from the disclosure herein given.

To this end my invention consists in the novel construction, arrangement, and combination of parts herein shown and described and more particularly pointed out in the claims.

In the drawings wherein like reference characters indicate like or corresponding parts:

Fig. 4 is a top plan view of a different form of complete indicator utilizing the invention;

Fig. 5 is a longitudinal sectional view through the device illustrated in Fig. 4;

Fig. 6 is a sectional elevation taken approximately on the line 6—6 of Fig. 5; and Fig. 7 is a diagrammatic view of the electrical circuit employed in the device illustrated in Figs. 4 through 6.

Figure 1:
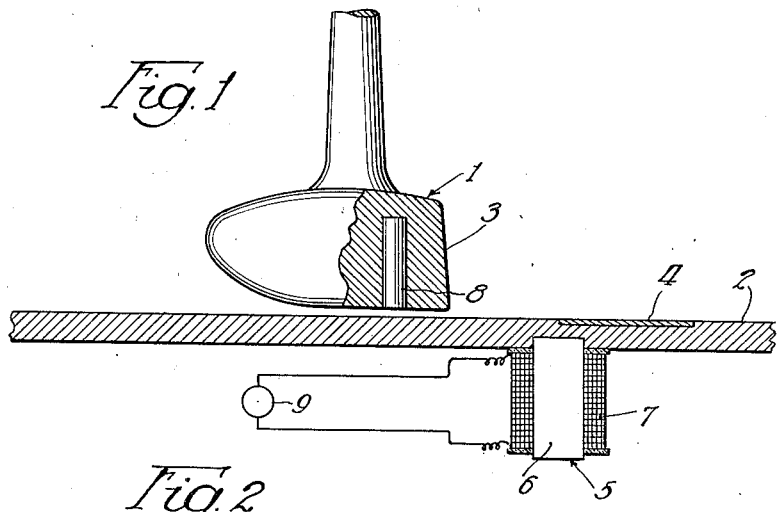
Fig. 1 is a sectional view in elevation of a club head and one of the induction coils utilized in the device.

The present invention is illustrated in the drawings in combination with a golf club, but might be readily adapted to other applications wherein the path of a movable club or element is utilized, and it is desired to ascertain the path of the same.

It might be mentioned that the present invention may be embodied in several forms to provide an indicator either to indicate that the club was swung in the proper path, or that the club head did not follow the proper path.

Illustrated in Fig. 1 is the head of a golf club designated generally by the numeral 1 positioned adjacent the playing surface 2 as it would be positioned at the end of a downward swing, 3 representing the hitting face which would be moving in the direction of the arrow, and a marker 4 representing the position of the ball.

Figure 2:
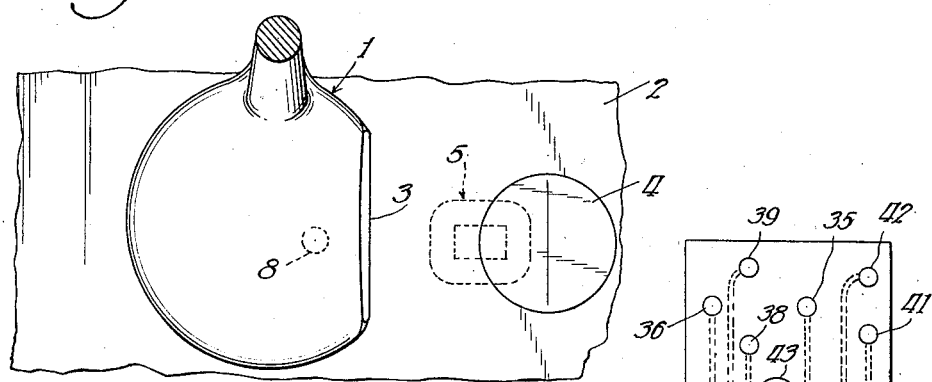
Fig. 2 is a top plan view of the same.

Directly below the playing surface 2 is mounted a solenoid designated generally by the numeral 5 comprising a core 6 and the winding 7, the solenoid being placed approximately as shown in Figs. 1 and 2 below the marker 4 at what would be normally directly under the point of impact of the club head and the ball. Embedded or otherwise carried in the club head 1 directly in line with what would normally be the point of impact on the club face 3 is a magnet 8, the latter being adapted to pass directly over the solenoid as the club makes its swing, assuming the club head is correctly positioned to hit the ball as represented by the marker 4. As the magnet 8 passes over the solenoid, the magnetic field so created will induce a current in the winding 7 in the solenoid which may then be utilized to give an indication on a meter or other suitable device, the latter being diagrammatically illustrated at 9 of Fig. 1. If desired, the current induced in the solenoid 5 may be amplified by an ordinary vacuum tube amplifier or other suitable means and then by means of a suitable relay, utilized to operate any desired light or other indicator.

Figure 3:
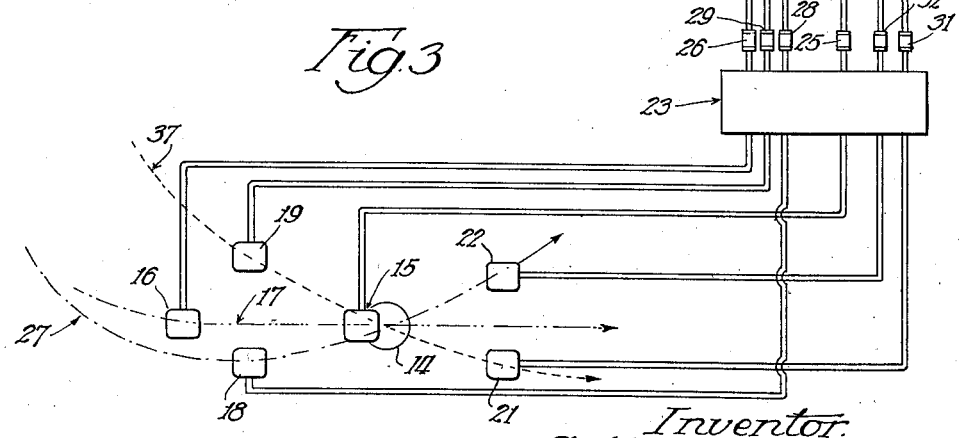
Fig. 3 is a diagrammatic view of one form of a complete indicator utilizing the invention.

Illustrated in Fig. 3 is one form of golf indicator embodying the present invention, the same being illustrated diagrammatically for simplicity. The marker 14 corresponds to the marker 4 illustrated in Figs. 1 and 2, 15 representing a solenoid positioned similarly to the solenoid 5. Directly behind the solenoid 15 is a second solenoid 16, the latter being positioned substantially in the path of the club head if it is swung correctly to hit a straight ball, the line 17 indicating the path of the club head for such a ball. At one side of the marker 14 and positioned behind the same is a third solenoid 18 and substantially similarly positioned on the opposite side of the marker is another solenoid 19. Also at said one side of the marker 14 and positioned forwardly of the same is a solenoid 21 and similarly positioned on the opposite side of the marker is a solenoid 22, the solenoids being positioned substantially as shown in Fig. 3. The six solenoids are connected as shown to suitable amplifiers designated as a whole by the numeral 23. The induced current through the solenoids over which the magnet 8 passes is amplified by the amplifying unit 23 after which the amplified current is utilized to operate individual relays 25, 26, 28, and 29, 31, and 32 operable by the solenoids 15, 16, 18, 19, 21, and 22, respectively, these relays in turn operating lights 35, 36, 38, 39, 41, and 42 or if desired, any other desired indicators. It might be added that by means of suitable equipment indicated diagrammatically at 43, an approximate indication of speed or distance might be obtained by utilizing the time interval between the actuation of the relays 26 and 25 or other means such equipment not being part of the present invention.

The operation of the device illustrated in Fig. 3 is as follows:

Assuming the club is swung correctly to produce a straight ball, the club head and magnet 8 will pass directly over the solenoid 16 and the solenoid 15. This will actuate relays 26 and 25, which in turn will operate the lights 36 and 35, thereby indicating that the club was swung correctly. If the club is swung incorrectly, as, for example, in the path indicated by the dotted line 27, which would result in the ball being pulled to the left or hooking as it would be called in golf, assuming the player to be right handed solenoids 18 and 22 and possibly solenoid 15 would energize relays 28, 32, and 25 and actuate the lights 38, 42, and 35. Similarly, if the club head is swung through the path 37, which would tend to curve the ball to the right or slice it as it is termed in golf, the solenoids 19, 21, and possibly 15, would operate the lights 39, 41, and 35, respectively, thus indicating the path of the club head.

Thus, it will be seen that it is readily ascertainable by merely swinging the club head through a so-called practice swing just what path the club head is taking relative the ball. If it is a substantially correct swing, the lights 36 and 35 will light up; if it is an incorrect swing, the other lights will light, depending upon the particular path of movement of the club head and indicate an error in the swing.

A different form of indicator is illustrated in Figs. 4 through 7, the indicator there illustrated being constructed to give a signal only when the club head moves in a predetermined path and correctly strikes the target. The device comprises a base 51 preferably inset flush with the ground surface 52. Rigidly carried by the base member 51 is a bracket 53 carrying insulated stationary contacts 54 and 55. Pivotally secured to the bracket 53 by means of a pin 56 is a target member designated generally by the numeral 57, the latter comprising a substantially L-shaped arm 58 as shown, one end 59 of which carries a movable contact 60. This is adapted to engage the stationary contacts 54 and 55 and make connection between the same. The target 57 is constructed in the form of a disc 61 of a diameter approximately that of an ordinary golf ball. The disc 61 is made of soft rubber or other flexible material, and it will be noted that the upper half of the disc extends beyond the upper end of the arm 58. Thus, should the club head strike the upper half of the disc, the latter will give without materially moving the arm 57, while if the disc is hit at the lower half, the arm will be moved. The arm 58 is rigidly secured to the shaft or pin 56 as is a downwardly extending arm 58'. A spring 62 is engageable at one end with the arm 58' and at the other with the base 51, the spring tending to rotate the arm 58' to maintain the target in the vertical position illustrated in the drawings. The base member 51 is provided with an opening 63 through which the target is movable from the vertical position illustrated in the drawings to a more or less horizontal position at or below the surface of the base 51. A pair of solenoids 64 and 65 are mounted on said base member on opposite sides of said target spaced from the striking face thereof. These solenoids may be housed in any suitable cases 66 of non-metallic material providing means securing the solenoids to the base. The solenoids are positioned with their axes horizontal, and are raised as high above the playing surface as may be practical so that the club head will substantially pass between them in its movement towards the target. The club head 71 in Fig. 5 is constructed substantially identical with the club head 1, having the magnet embedded therein as previously described. As shown diagrammatically in Fig. 7, the solenoids 64 and 65 are connected in parallel and are preferably connected to a suitable amplifier, as, for example, a vacuum tube 67, the output of which is connected to a relay designated generally by the numeral 68. The contacts 71 and 72 of the relay 68 are in series with a battery or other power source 73, indicating means 74 and the target switch comprising contacts 54, 55, and 59.

Operation of the device is as follows:

When the club is swung towards the target, the club head will pass substantially between the solenoids 65 and 64 as it moves towards the target disc 61. If the club head doing this movement is positioned too high with respect to the disc 61, the club head will strike only the upper half of the disc which will give so that the arm 57 will remain substantially stationary and contacts 54 and 55 will remain disconnected and open. In such a case, the club head will pass above the solenoids and it is immaterial whether or not a current is induced in either of the solenoids by movement of the magnet in the club head. It will also be noted that the contact 60 is spaced from the contacts 54 and 55 so that the arm 58 may be partially deflected without closing the circuit if, for example, the target was lightly or incorrectly hit. If the correct swing is made, the magnet in the club head will pass substantially equidistant between the solenoids 64 and 65 at the proper height above the playing surface. The solenoids are so positioned relative said path that no current will be induced in either of the same. The club head strikes the disc 61 and arm 57, rotating the latter about the pin 58, the movable contact 59 closing the circuit between the contacts 54 and 55. Thus, a closed circuit is formed by the power source 73, contacts 71 and 72, contacts 54, 55, and 59, and the indicating means 74. The indicating means may be in any suitable form such as a light, bell, etc. Should the club head in its travel be positioned the proper distance above the playing surface, so that the target is hit squarely but the club head is off too much to the right or left, a current will be induced in the closest solenoid. The induced current is then amplified by the vacuum tube 67 and fed into the relay 68, the latter opening contacts 71 and 72, thereby breaking the circuit previously mentioned regardless of whether or not the contacts 54 and 55 are closed. It will be seen therefore that the operation briefly is this:

If the club head is correctly swung through the proper path, the target will be hit, closing the circuit and operating the indicating means. If the club head is at the proper height from the playing surface, but off to the right or left, the indicating means will not be operated as the induced current in the solenoid will open the circuit, while if the club is too high above the playing surface, no indication will be given as the target switch will not be closed. Obviously, the construction illustrated in Fig. 3 and the construction illustrated in Figs. 4 through 7 may be combined in various combinations to achieve varied results.

It might be mentioned that while the device may be operated by means of an induced current, a similar result might be achieved by means of varying the capacity between the club head and the playing surface. That is, instead of having the club head induce a current in a solenoid, the club head when passing over a pre-determined portion of the playing surface, would vary the capacity in a tuned circuit and thereby actuate the relays to achieve the desired result.

Having thus described my invention, it is obvious that various immaterial modifications may be made in the same without departing from the spirit and scope of my invention; hence, I do not wish to be understood as limiting myself to the exact form, construction, arrangement and combination of parts herein shown and described or uses mentioned.

What I claim as new and desire to secure by Letters Patent is:

1. In a golf swing indicating device, the combination of a movable, manually operated club having a head at one end thereof, an electrical circuit, a portion of said circuit being positioned adjacent the normal path of said club head, means carried by said club head cooperable with said portion of the circuit for producing a response therein when said portion and means are operatively moved relative one another by said club, and further means connected in said circuit operable by such response.

2. In a golf swing indicating device, the combination of a movable, manually operated club having a head at one end, an electrical circuit, means carried by said club head cooperable with said circuit for inducing a response therein when the club head is moved adjacent a portion of the same, and indicating means connected in said circuit operable by such response.

3. In a golf swing indicating device, the combination of a golf club, a magnet embedded in the head thereof adjacent the bottom face, a playing surface, a coil positioned adjacent said surface, and indicating means operatively connected to said coil and actuable by the current induced therein when the magnet in said club head moves adjacent said coil as the club is swung over said playing surface.

4. In a golf swing indicating device, the combination of a golf club having a head at one end thereof, a playing surface, said club head adapted to be moved adjacent said surface when the club is swung, a magnet carried by said head, and indicating means operable by said magnet as the club head passes over said playing surface.

5. In a golf swing indicating device, the combination of a golf club having a head at one end thereof, a playing surface, said club head adapted to be moved adjacent said surface when the club is swung, a magnet carried by said head, and means adjacent said playing surface operable by said magnet as the club head passes over said playing surface for indicating the path of said club head.

6. In a golf swing indicating device, the combination of a golf club having a head at one end thereof, a playing surface, said club head adapted to be moved adjacent said surface when the club is swung, a magnet carried by said head, and a coil positioned below and adjacent said surface, said magnet operable as the club head passes over said coil when the club is swung adjacent said surface, to induce a current in said coil, means for amplifying said induced current and indicating means operable by said amplified current.

7. In a golf swing indicating device, the combination of a golf club having a head adapted to be moved adjacent said surface when the club is swung, a magnet carried by said head, a plurality of coils positioned adjacent said surface, said magnet operable as the club head passes adjacent certain of said coils to create a response in the latter for indicating the path of said club head, and means operable by such response.

8. In a golf club swing indicator, the combination of a target, indicating means, responsive to action of the club upon said target, and further means actuated by movement of the club independently of the action of said club on said target for controlling the response of said indicating means.

9. In a golf club swing indicator, the combination of a movable target, indicating means, an electrical circuit for operating said means, a switch in said circuit operable by said target to close said circuit, and a second switch in said circuit responsive to predetermined movement of the club to break the circuit prior to the actuation of said target by said club.

10. In a golf club swing indicator, the combination of a target means, indicating means responsive to movement of said target means, and further means responsive to movement of the club independently of movement of said target means for rendering said indicating means inoperative.

11. In a golf club swing indicator, the combination of a movable target, indicating means, an electrical circuit for operating said means, a switch in said circuit operable by said target to close said circuit, a second switch in said circuit operable to break the same, a coil, means carried by the club for inducing a current in said coil, and further means operable by said induced current for opening said second switch.

12. In a golf club swing indicator, the combination of a movable target, indicating means, an electrical circuit for operating said means, a switch in said circuit operable by said target to close said circuit, a second switch in said circuit operable to break the same, a pair of spaced coils positioned at the striking side of said target, a magnet carried by the club for inducing a current in one of the coils when passing adjacent the same, and means operable by said induced current for opening said second switch.

13. In a golf club swing indicator, the combination of a target comprising an arm pivotally supported, the upper portion of said arm being flexible, a spring operatively associated with said arm to maintain the latter in vertical position, indicating means, an electrical circuit for operating said means, a switch in said circuit, a pair of solenoids positioned adjacent the path of the club, a magnet carried by said club for inducing a current in one of the coils when passing adjacent the same, means actuated by said induced current for controlling said switch, and further controlling means in said circuit operable by said target.

ARTHUR B. MODINE.